Figure 1:
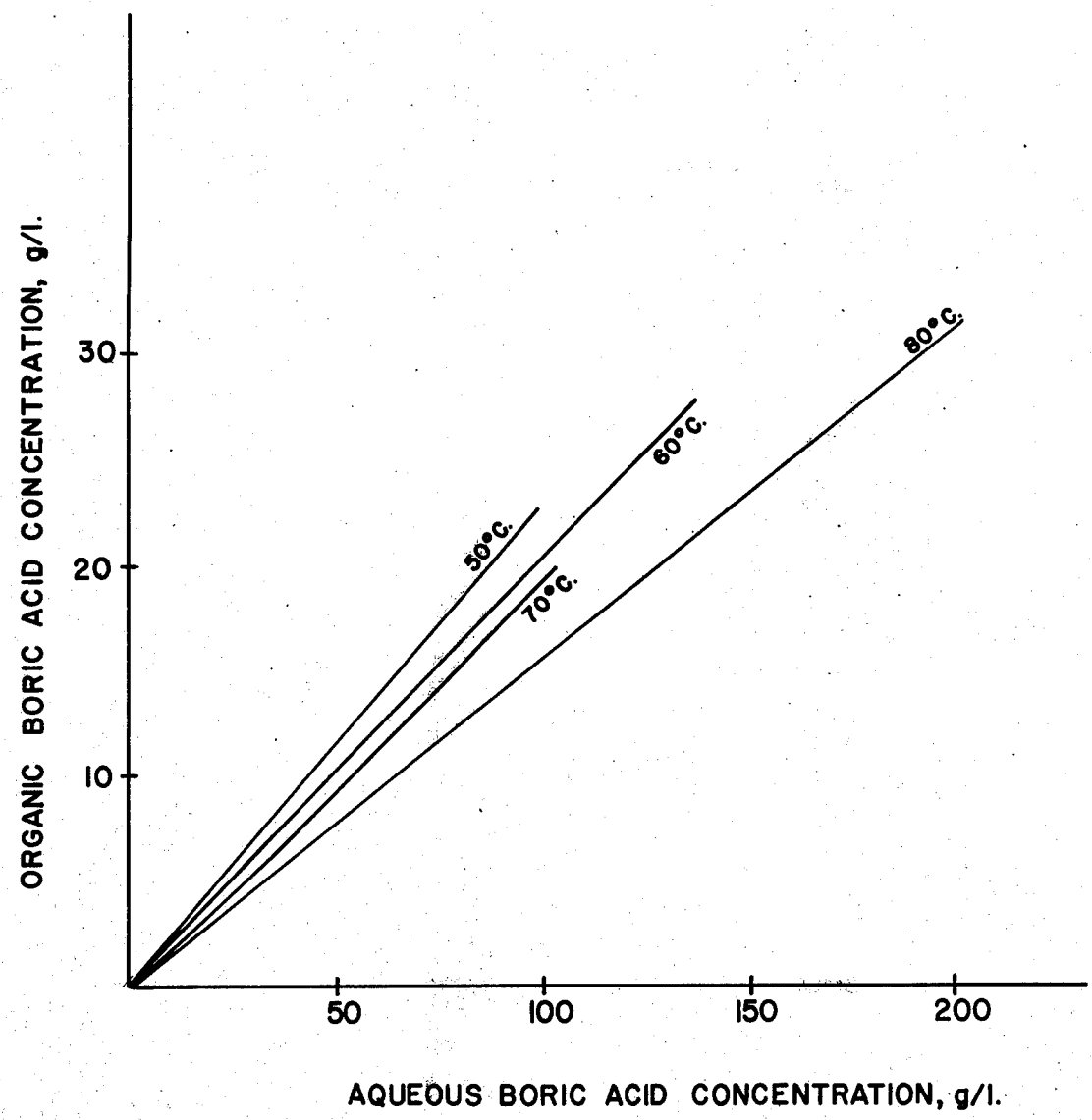

United States Patent [19]

Brown et al.

[11] 4,058,588

[45] Nov. 15, 1977

[54] PROCESS FOR RECOVERING BORIC ACID

[75] Inventors: Clifford Gordon Brown, Fetcham; Brian Robert Sanderson, New Malden, both of England

[73] Assignee: United States Borax & Chemical Corporation, Los Angeles, Calif.

[21] Appl. No.: 625,145

[22] Filed: Oct. 23, 1975

[30] Foreign Application Priority Data

Oct. 23, 1974 United Kingdom ............... 45832/74

[51] Int. Cl.$^2$ ............................................. C01B 35/10
[52] U.S. Cl. ................................................... 423/283
[58] Field of Search .................. 423/279, 283; 210/21; 260/606.5

[56] References Cited

U.S. PATENT DOCUMENTS

| 1,308,577 | 7/1991 | Calvert et al. | 423/283 |
| 3,011,871 | 12/1961 | May et al. | 423/283 |
| 3,855,392 | 12/1974 | Folkestad et al. | 423/283 X |

OTHER PUBLICATIONS

Gerrard; W., *The Organic Chemistry of Boron;* Academic Press, N.Y., 1961, pp. 5-8.

Nelson et al., "Quarterly Progress Report" A.E.C. TID-10143 of March 31, 1953, pp. 24-31.

*Primary Examiner*—G. O. Peters
*Attorney, Agent, or Firm*—James R. Thornton

[57] ABSTRACT

Process for recovering boric acid from a sodium borate-mineral acid reaction product mixture by use of a diluted monohydric alcohol having 6 to 12 carbon atoms.

6 Claims, 2 Drawing Figures

PROCESS FOR RECOVERING BORIC ACID

This invention relates to a process for the production of boric acid from sodium biborate using solvent extraction procedures.

Complete conversion of sodium biborate to boric acid is effected by neutralizing the biborate solution with a mineral acid, such as sulfuric acid or hydrochloric acid, to a pH of about 5.5. Boric acid is formed according to the following reaction (for borax $\cdot 5H_2O$):

$$Na_2B_4O_7 \cdot 5H_2O + H_2SO_4 \rightarrow 4H_3BO_3 + Na_2SO_4$$

The essence of any process to produce boric acid from borax is therefore to obtain an efficient method of separating boric acid from sodium sulfate. Existing methods use selective crystallization for separation which requires the recycling of boric acid mother liquors containing quantities of sodium sulfate and vice versa.

It is known that small quantities of borates may be removed from alkaline aqueous salt solutions by means of solvent extraction using an aliphatic diol or polyol dissolved or dispersed in a non-reacting diluent. Further, certain monohydric aliphatic alcohols are known to extract small quantities of boric acid from aqueous solutions which may be re-extracted into aqueous liquid at a pH above 7.

It has now been found that boric acid may be selectively removed from concentrated solutions of sodium salts and boric acid to obtain loadings in the organic phase high enough to make a boric acid production process feasible.

It is, therefore, an object of the present invention to provide a process for the production of boric acid from sodium biborate wherein boric acid is separated from sodium salts present by solvent extraction into an organic phase and recovered by crystallization. An advantage of a solvent extraction system is that purified streams of boric acid and sodium salt are obtained from which crystalline products of acceptable quality can be recovered directly with minimum washing.

The process comprises selectively extracting boric acid from a saturated solution of sodium biborate which has been neutralized by addition of a mineral acid. At an elevated temperature, boric acid is extracted into an organic phase consisting of a water-immiscible monohydric aliphatic alcohol dissolved in a suitable diluent. The product of boric acid crystals is obtained by either stripping the solvent mixture with recycled hot dilute boric acid solution or hot water to give a saturated aqueous solution which crystallizes on cooling, or by cooling the organic phase whereby boric acid crystallizes. The sodium salt present can be similarly recovered from the aqueous raffinate by cooling and crystallizing steps.

Of the many organic compounds capable of extracting boric acid from aqueous solution, monohydric alcohols are preferred for a boric acid manufacturing process as they are readily available and relatively inexpensive materials which makes solvent extraction comparable costwise with previous processes. Further advantages of monohydric alcohols will be apparent hereinafter from the specification. The term 'monohydric alcohol' as used in the specification means the long chain aliphatic alcohols containing from 6 to about 12 carbon atoms.

When an undiluted monohydric alcohol is mixed with an acidified aqueous solution of borate and sulfate, the distribution coefficient of boron between the alcohol and boric acid in solution is independent of the equilibrium aqueous boron concentration, i.e. the equilibrium organic boron concentration is proportional to the aqueous equilibrium boron concentration. However, neat alcohols separate slowly from aqueous borate solutions which in effect precludes their use in a practical system alone. A small addition of an additive such as a de-emulsifying agent may assist in obtaining better phase separation, but it was found that the addition of a non-reacting diluent significantly assists phase disengagement with only a moderate reduction of boron extraction per unit volume of organic phase.

For rapid phase disengagement in a practical process, the organic extractant comprises the monohydric alcohol and diluent in a volume ratio of 1 part alcohol to 0.25 to 4 parts of diluent. Preferably, the volume ratio is in the range of 1:0.5 and 1:1.5.

For boric acid production, the materials for use as diluents must have flash points high enough for their utility at temperatures up to 80° C., which is the maximum preferred process operating temperature. Diluents of this type include long chain hydrocarbons containing between 12 and 17 carbon atoms, alcohols containing 9 – 11 carbon atoms, water-immiscible diluents of the glycol-ether type of general formula $XO(CH_2)_nOY$ wherein $n$ is 2 or 3 and X and Y may be the same or different and are hydrogen, monocyclic aryl or lower alkyl, or any mixtures of the above diluents.

The presence of a mineral acid in the aqueous solutions was found to have a beneficial effect on the distribution of boron between the monohydric alcohols and aqueous solutions. Generally, it was discovered that increasing acidity increased the extraction of boron by the alcohols.

At elevated temperatures it was found that the quantity of boron (boric acid) capable of being extracted into an organic phase increased with increasing temperature but at the same time there was a decrease in the boron distribution coefficient.

Extraction isotherms for boric acid between 50% 2-ethylhexanol in Shellsol A and water are presented graphically in FIG. 1. The slope of each graph represents an average value for the boron distribution coefficient. Despite the decreasing distribution coefficient, a boric acid production process is advantageous at the preferred temperatures of between 50° C. and 80° C.

Figure 2:
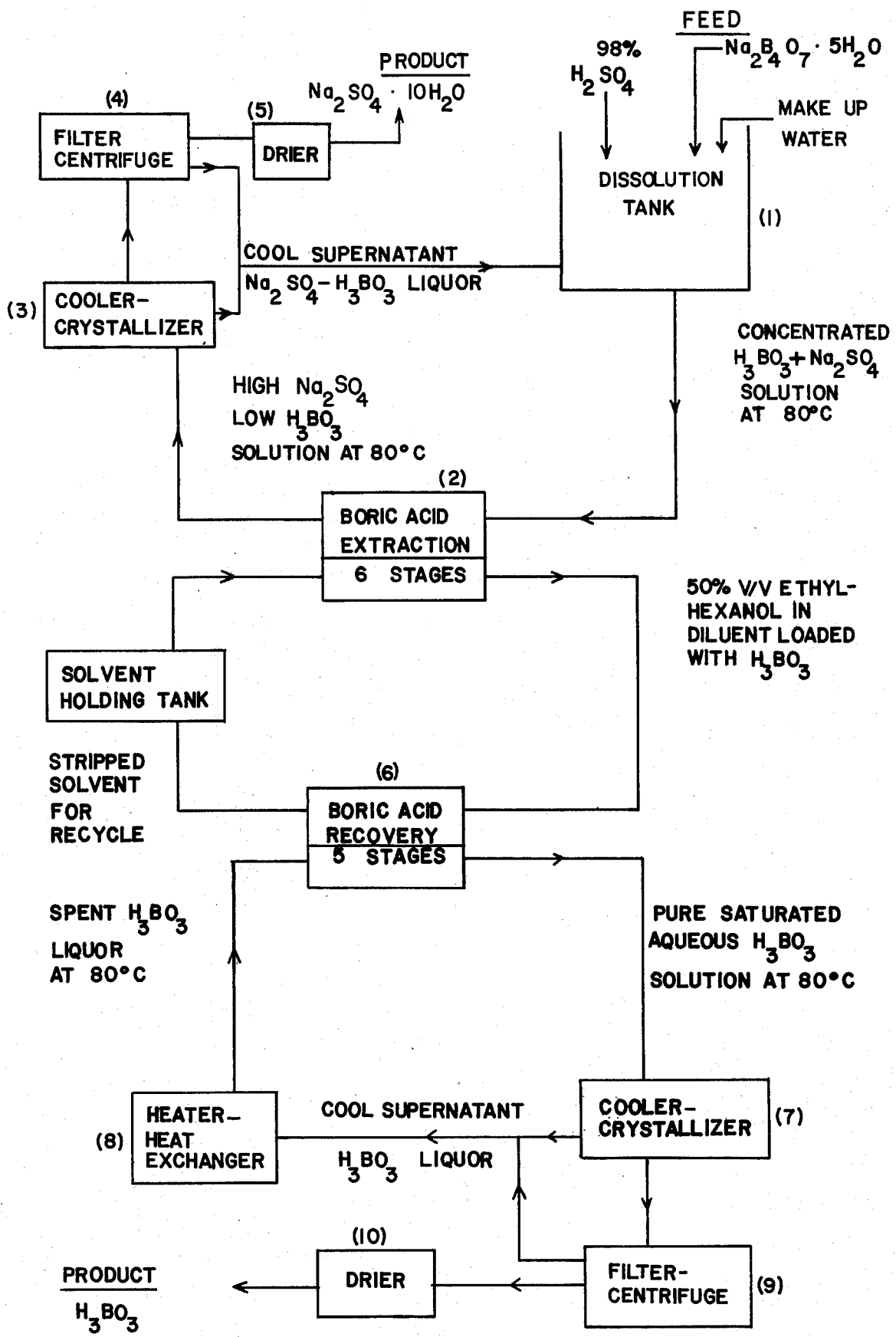

One aspect of the invention will now be further described by an Example wherein boric acid is manufactured from a saturated solution of sodium biborate which has been neutralized by the addition of sulfuric acid. Reference is made to FIG. 2.

EXAMPLE

Concentrated sulfuric acid, borax $\cdot 5H_2O$, spent sodium sulfate/boric acid solution and fresh water (to maintain water balance) are mixed in suitable proportions in a dissolution tank 1 and adjusted to a temperature of 80° C. This solution is then passed into an extraction section 2 where the conditions are adjusted to remove most, but not all, of the boric acid by extraction into an organic phase containing 50% 2-ethylhexanol and 50% hydrocarbon diluent. Aqueous raffinate from 2 is cooled in cooler 3 and sodium sulfate ($Na_2SO_4 \cdot 10H_2O$) is allowed to crystallize. Mother liquor from cooler 3 is then returned to the dissolution tank. Crystals from cooler 3 plus some mother liquor are transferred to separator 4 where sodium sulfate product is recovered by filtration or by centrifuging. Separated spent liquor is returned to the dissolution tank 1 whilst sodium sulfate is passed on to a drier 5 (if required). Loaded solvent from 2 is passed to a stripping section 6 where boric acid is recovered by washing with hot spent boric acid solution at 80° C. coming from the heater 8. Saturated aqueous boric acid solution derived from 6 is passed to 7, cooled and allowed to crystallize. Cold weak boric acid mother liquor from 7 is passed to 8 where it is once more heated before returning to the stripping section 6. Crystals of boric acid plus some mother liquor from 7 are passed to 9. In 9 boric acid crystal is separated and passed into 10, the drier. Mother liquor (plus any washings) from 9 is returned to 8 for heating to the operating temperture before subsequent return to the stripping stage 6. In this way, solvent and aqueous phases are continuously recycled through the process.

In another aspect of the invention the boric acid, after extraction into the organic phase 2, is passed directly to the cooler/crystallizer 7 wherein crystals of boric acid are passed into 9 and 10 as described in the foregoing example. The solvent may then be recirculated to 2.

Various changes and modifications of the invention can be made and, to the extent that such variations incorporate the spirit of this invention, they are intended to be included within the scope of the appended claims.

What is claimed is:

1. The process for recovering boric acid from an acidic sodium borate-mineral acid reaction product mixture which comprises extracting said product mixture with a monohydric alcohol-diluent solution at a temperature of about 50° to 80° C., stripping the alcohol-diluent solution with recycled hot dilute boric acid solution, cooling to crystallize said boric acid, and recovering said boric acid from said cooled solution, in which said monohydric alcohol is an aliphatic alcohol containing 6 to about 12 carbon atoms and said diluent is selected from $C_{12-17}$ hydrocarbons, $C_{9-11}$ alcohols and water-immiscible glycol ethers of the formula $XO(CH_2)_nOY$ wherein $n$ is 2 or 3 and X and Y are each selected from hydrogen, lower alkyl and monocyclic aryl.

2. The process according to claim 1 in which said monohydric alcohol is 2-ethylhexanol.

3. The process according to claim 1 in which the volume ratio of monohydric alcohol to diluent is 1 to 0.25-4.

4. The process according to claim 1 in which the volume of monohydric alcohol to diluent is 1:0.5 to 1:1.5.

5. The process according to claim 1 in which said mineral acid is sulfuric acid.

6. The process according to claim 1 in which said reaction product mixture has a pH of about 5.5.

* * * * *